(12) United States Patent
Kubota

(10) Patent No.: US 10,870,420 B2
(45) Date of Patent: Dec. 22, 2020

(54) BRAKING DEVICE FOR VEHICLE

(71) Applicant: ADVICS CO., LTD., Kariya (JP)

(72) Inventor: Hayato Kubota, Kariya (JP)

(73) Assignee: ADVICS CO., LTD., Kariya (JP)

( * ) Notice: Subject to any disclaimer, the term of this patent is extended or adjusted under 35 U.S.C. 154(b) by 153 days.

(21) Appl. No.: 16/084,650

(22) PCT Filed: Mar. 23, 2017

(86) PCT No.: PCT/JP2017/011747
§ 371 (c)(1),
(2) Date: Sep. 13, 2018

(87) PCT Pub. No.: WO2017/164315
PCT Pub. Date: Sep. 28, 2017

(65) Prior Publication Data
US 2019/0077386 A1 Mar. 14, 2019

(30) Foreign Application Priority Data

Mar. 25, 2016 (JP) .................................. 2016-062525

(51) Int. Cl.
*B60T 13/66* (2006.01)
*B60T 8/17* (2006.01)
(Continued)

(52) U.S. Cl.
CPC .............. *B60T 13/662* (2013.01); *B60T 1/10* (2013.01); *B60T 7/042* (2013.01); *B60T 8/00* (2013.01);
(Continued)

(58) Field of Classification Search
CPC .... B60T 13/662; B60T 13/146; B60T 13/686; B60T 1/10; B60T 7/042; B60T 8/00;
(Continued)

(56) References Cited

U.S. PATENT DOCUMENTS

| | | | | |
|---|---|---|---|---|
| 5,378,052 A | * | 1/1995 | Yoshino | B60T 7/042 188/1.11 L |
| 6,945,610 B1 | * | 9/2005 | Mizutani | B60T 8/3275 303/11 |

(Continued)

FOREIGN PATENT DOCUMENTS

| | | |
|---|---|---|
| JP | 2006096218 A | 4/2006 |
| WO | 2015045902 A1 | 4/2015 |

OTHER PUBLICATIONS

English language version of International Search Report dated Jun. 27, 2017 by the Japanese Patent Office as the International Searching Authority in International Patent Application No. PCT/JP2017/01147, 1 page.

(Continued)

*Primary Examiner* — Thomas E Worden
(74) *Attorney, Agent, or Firm* — Buchanan Ingersoll & Rooney PC

(57) ABSTRACT

A vehicle braking device includes a storage unit storing a first relationship between the brake operation amount and a first differential pressure when the brake operation amount is within a range less than a first brake operation amount and is increasing, and a second relationship between the brake operation amount and the first differential pressure when the brake operation amount is within a range less than the first brake operation amount and is decreasing. In the first relationship a relationship in which the first differential pressure increases as the brake operation amount increases, and in the second relationship a relationship in which the first differential pressure is reduced as the brake operation amount is reduced. The first differential pressure per unit reduction in the brake operation amount in the second relationship is greater than the first differential pressure per (Continued)

unit increase of the brake operation amount in the first relationship.

1 Claim, 9 Drawing Sheets

(51) Int. Cl.
| | |
|---|---|
| *B60T 8/48* | (2006.01) |
| *B60T 8/36* | (2006.01) |
| *B60T 8/00* | (2006.01) |
| *F16D 61/00* | (2006.01) |
| *B60T 13/14* | (2006.01) |
| *B60T 13/68* | (2006.01) |
| *B60T 1/10* | (2006.01) |
| *B60T 7/04* | (2006.01) |
| *B60T 8/172* | (2006.01) |

(52) U.S. Cl.
CPC ............... *B60T 8/17* (2013.01); *B60T 8/36* (2013.01); *B60T 8/4872* (2013.01); *B60T 13/146* (2013.01); *B60T 13/686* (2013.01); *F16D 61/00* (2013.01); *B60T 8/172* (2013.01); *B60T 2220/04* (2013.01); *B60T 2270/604* (2013.01); *B60T 2270/606* (2013.01)

(58) Field of Classification Search
CPC . B60T 8/17; B60T 8/36; B60T 8/4872; B60T 8/172; B60T 2220/04; B60T 2270/604; B60T 2270/606; F16D 61/00
See application file for complete search history.

(56) References Cited

U.S. PATENT DOCUMENTS

| | | | | |
|---|---|---|---|---|
| 9,108,604 B2* | 8/2015 | Bohm | .................. | B60T 8/4081 |
| 9,358,964 B2* | 6/2016 | Ito | ......................... | B60T 13/686 |
| 10,569,657 B2* | 2/2020 | Yamamoto | ............ | B60T 13/142 |
| 2002/0153771 A1* | 10/2002 | Obuchi | ................. | B60T 8/4081 |
| | | | | 303/155 |
| 2004/0135432 A1* | 7/2004 | Reuter | ..................... | B60T 7/042 |
| | | | | 303/152 |
| 2005/0269875 A1 | 12/2005 | Maki et al. | | |
| 2007/0210641 A1* | 9/2007 | Itoh | ........................ | B60T 8/4059 |
| | | | | 303/11 |
| 2009/0024291 A1* | 1/2009 | Masuda | .................. | B60T 8/442 |
| | | | | 701/70 |
| 2009/0096280 A1* | 4/2009 | Yamanao | ................ | B60T 8/442 |
| | | | | 303/11 |
| 2015/0107241 A1* | 4/2015 | Okano | .................... | B60T 8/367 |
| | | | | 60/545 |
| 2015/0183411 A1* | 7/2015 | Sakurazawa | .......... | B60T 8/4081 |
| | | | | 701/70 |
| 2015/0291140 A1* | 10/2015 | Ishida | ................... | B60T 13/165 |
| | | | | 303/10 |
| 2016/0016568 A1* | 1/2016 | Ishida | .................... | B60T 7/042 |
| | | | | 303/15 |
| 2016/0200295 A1* | 7/2016 | Nishikawa | ................ | B60T 1/10 |
| | | | | 701/70 |
| 2016/0280201 A1* | 9/2016 | Choi | .................. | B60W 10/188 |
| 2017/0274880 A1* | 9/2017 | Nishiwaki | ............... | B60T 17/22 |
| 2018/0162338 A1* | 6/2018 | Irwan | .................... | B60T 13/745 |
| 2018/0162339 A1* | 6/2018 | Irwan | ...................... | B60T 8/885 |
| 2018/0162340 A1* | 6/2018 | Irwan | ...................... | B60T 13/66 |
| 2018/0244254 A1* | 8/2018 | Okano | ..................... | B60T 7/042 |
| 2019/0023250 A1* | 1/2019 | Gaulke | ................... | B60T 7/042 |
| 2019/0039585 A1* | 2/2019 | Krautter | .................. | B60T 8/40 |
| 2019/0077386 A1* | 3/2019 | Kubota | .................... | B60T 8/17 |
| 2019/0193701 A1* | 6/2019 | Kuhlman | .............. | B60T 13/745 |
| 2020/0016983 A1* | 1/2020 | Kim | ........................ | B60T 7/042 |

OTHER PUBLICATIONS

Written Opinion dated Jun. 27, 2017 by the Japanese Patent Office as the International Searching Authority in International Patent Application No. PCT/JP2017/01147, 6 pages.

* cited by examiner

BRAKING DEVICE FOR VEHICLE

TECHNICAL FIELD

The present invention relates to a braking device for a vehicle including a hydraulic pressure braking device and a regenerative braking device.

BACKGROUND ART

The braking device for a vehicle that carries out regenerative cooperation includes a hydraulic pressure braking device that applies, to a wheel, a hydraulic pressure braking force corresponding to a hydraulic pressure in a wheel cylinder, and a regenerative braking device that applies, to the wheel, a regenerative braking force obtained by converting a kinetic energy of a vehicle to an electrical energy. In the braking device for the vehicle, consideration is made to obtain the electrical energy by generating the regenerative braking force as much as possible at the time of braking. For example, with the braking device for the vehicle configured so as to produce an invalid stroke with respect to a brake operation, the generation of the hydraulic pressure braking force at the beginning of the operation is suppressed and the regenerative braking force is maximally exerted. The configuration in which the invalid stroke is produced is described in, for example, Japanese Unexamined Patent Application Publication No. 2006-96218.

CITATIONS LIST

Patent Literature

Patent Literature 1: Japanese Unexamined Patent Application Publication No. 2006-96218

SUMMARY OF INVENTION

Technical Problems

In some braking devices for vehicles, an actuator including a pump and a differential pressure valve, for example, is arranged between a master cylinder and a wheel cylinder. In such braking devices for vehicles, the pressure of the wheel cylinder (hereinafter also referred to as the wheel pressure) can be controlled by controlling the actuator. Such configurations are also adopted in the braking device for the vehicle that carries out regenerative cooperation as described above. In the braking device for the vehicle, the actuator is activated during the invalid stroke to compensate for the lack of braking force.

In a configuration of controlling the differential pressure valve to control the wheel pressure, the actual wheel pressure (actual differential pressure) generated by the differential pressure valve differs between when a brake pedal is being pressed and when the brake pedal is being returned, even when an indicated pressure to the differential pressure valve is constant, due to the property (hysteresis) of the differential pressure valve. This difference may be the cause of a driver feeling uncomfortable in the brake operation. When fluctuation occurs at a position of the brake pedal by the adjustment of the wheel pressure not dependent on the brake operation, the pedal feeling is influenced.

In light of the foregoing situation, the present invention aims to provide a braking device for a vehicle capable of suppressing the uncomfortable feeling due to the property of the differential pressure valve while suppressing the influence on the pedal feeling.

Solutions to Problems

A braking device for a vehicle according to the present invention including: a hydraulic pressure braking device that applies, to a wheel of the vehicle, a hydraulic pressure braking force corresponding to a hydraulic pressure in a wheel cylinder; and a regenerative braking device that applies, to the wheel, a regenerative braking force obtained by converting a kinetic energy of the wheel to an electrical energy, the hydraulic pressure braking device including: a differential pressure valve arranged on a hydraulic pressure path connecting a master chamber of a master cylinder and the wheel cylinder; and a pump that ejects brake fluid to a portion between the differential pressure valve and the wheel cylinder on the hydraulic pressure path; and the braking device for the vehicle being configured to adjust a differential pressure on a master chamber side and a wheel cylinder side of the differential pressure valve while activating the pump and suppress generation of a master pressure that is the hydraulic pressure in the master chamber until the brake operation amount reaches a first brake operation amount, the first brake operation amount being set based on a maximum regenerative braking force generable by the regenerative braking device; wherein: the braking device for the vehicle includes: a storage unit storing a first relationship and a second relationship, the first relationship being a relationship of the brake operation amount and the differential pressure when the brake operation amount is in a range smaller than the first brake operation amount and is increasing, and the second relationship being a relationship of the brake operation amount and the differential pressure when the brake operation amount is in a range smaller than the first brake operation amount and is reducing; and a control unit that controls the differential pressure valve, based on the first relationship and the second relationship stored in the storage unit; the first relationship is a relationship in which the differential pressure increases as the brake operation amount increases; the second relationship is a relationship in which the differential pressure reduces as the brake operation amount reduces; and a reduction width of the differential pressure per unit reduction width of the brake operation amount in the second relationship is set to be greater than an increase width of the differential pressure per unit increase width of the brake operation amount in the first relationship.

Advantageous Effects of Invention

According to the property of the differential pressure valve, the actual wheel pressure becomes greater than the indicated pressure to the differential pressure valve when the brake pedal is returning. Thus, when the driver carries out the pedal returning operation, the braking force tends to remain longer than as imaged by the driver, and the driver may feel an uncomfortable feeling in the operation. According to the present invention, however, when the brake operation amount is reducing, the differential pressure valve is controlled based on the second relationship in which the change gradient is greater than that in the first relationship used when the brake operation amount is increasing. Thus, the control that takes into consideration the property of the differential pressure valve is carried out when the brake operation amount is reducing, the generation of the operation feeling that does not match the intention of the driver, that is, the residual feeling of the braking force at the time of returning the pedal is suppressed, and the uncomfortable feeling by the property of the differential pressure valve can be suppressed. Furthermore, according to the present invention, two relationships that differ according to the operation state are used "while the generation of the master pressure is being suppressed", and thus the fluctuation of the master pressure due to the difference in the adjustment of the wheel pressure is also suppressed, and for example, the influence on the brake operation member such as the brake pedal is also suppressed. That is, the influence on the pedal feeling is also suppressed by using the two relationships. That is, according to the present invention, the uncomfortable feeling by the property of the differential pressure valve can be suppressed while suppressing the influence on the pedal feeling.

DESCRIPTION OF EMBODIMENTS

Figure 1:
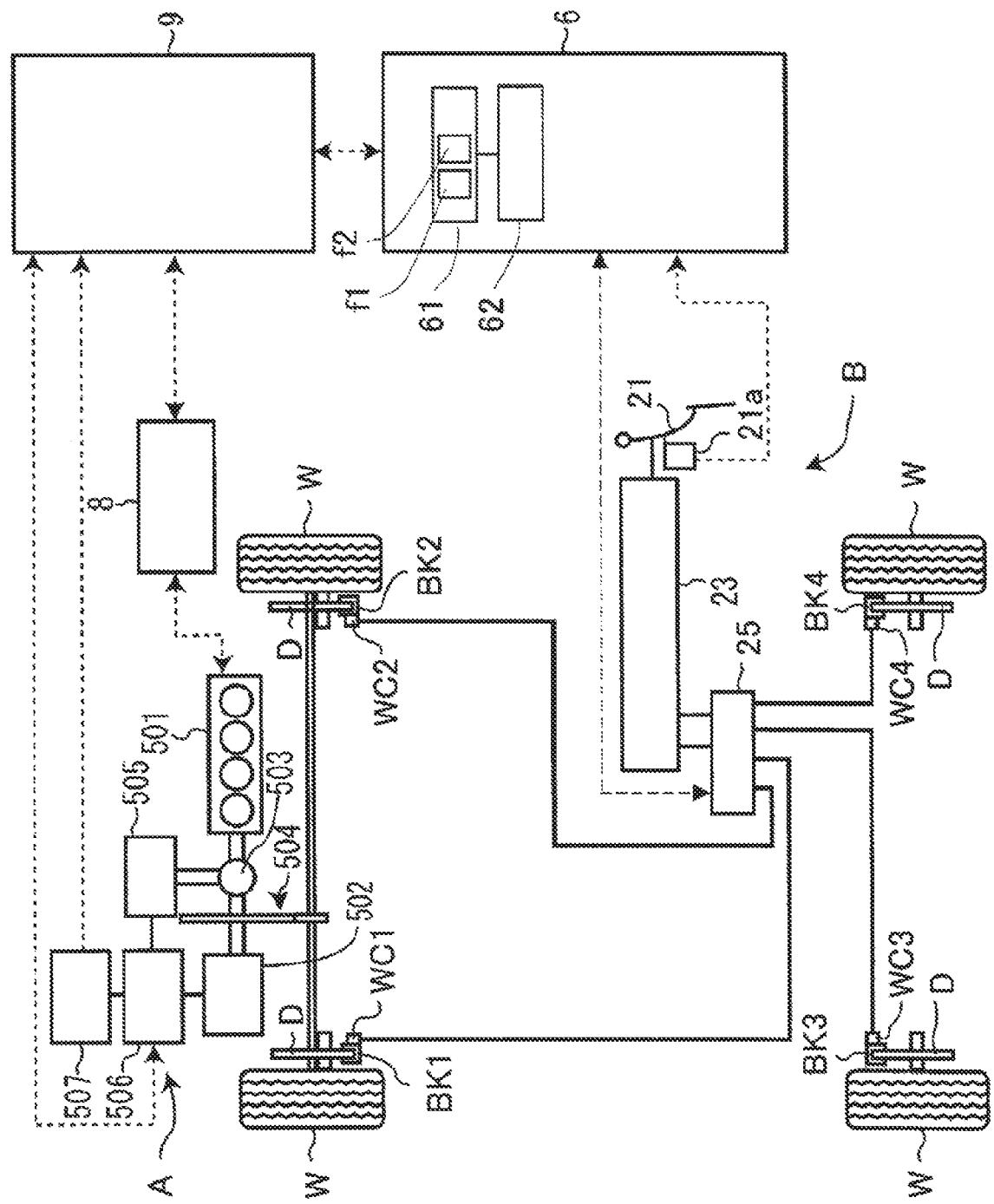
FIG. 1 is a configuration view showing a configuration of a hybrid vehicle of the present embodiment.

Hereinafter, an embodiment of the present invention will be described based on the drawings. A hybrid vehicle (hereinafter also simply referred to as a vehicle) on which a braking device for a vehicle according to a first embodiment is mounted is a vehicle that drives a drive wheel, for example, left and right front wheels W by a hybrid system. As shown in FIG. 1, the vehicle includes a hydraulic pressure braking device A, a regenerative braking device B, an engine ECU 8, an engine 501, a power dividing mechanism 503, and a power transmitting mechanism 504.

The braking device for the vehicle according to the first embodiment includes the hydraulic pressure braking device A that applies, to a wheel W, a hydraulic pressure braking force corresponding to the hydraulic pressure in a wheel cylinder WC, and a regenerative braking device B that applies, to the wheel W, a regenerative braking force obtained by converting a kinetic energy of the vehicle to an electrical energy. The hydraulic pressure braking device A includes a brake pedal 21, a negative pressure booster 22, a master cylinder 23, a reservoir tank 24, a brake actuator 25, the wheel cylinder WC, friction brake mechanisms BK1 to BK4, a brake ECU 6, and a pedal stroke sensor 21a. The regenerative braking device B includes a hybrid ECU 9, a power generator 505, an inverter 506, and a battery 507. Details of the hydraulic pressure braking device A and the regenerative braking device B will be described later.

The driving force of the engine 501 is transmitted to a drive wheel through the power dividing mechanism 503 and the power transmitting mechanism 504. The driving force of the motor 502 is transmitted to the drive wheel through the power transmitting mechanism 504. The inverter 506 converts voltage between the motor 502 and the power generator 505, and a battery 507 serving as a DC power supply. The engine ECU 8 adjusts the driving force of the engine 501, based on a command from the hybrid ECU 9. The hybrid ECU 9 controls the motor 502 and the power generator 505 through the inverter 506. The hybrid ECU 9 is connected to the battery 507 to monitor the charged state, the charging current, and the like of the battery 507.

The regenerative braking device B generates the regenerative braking force by the power generator 505 at the front wheel W, based on a "target regenerative braking force" to be described later. In the embodiment shown in FIG. 1, the motor 502 and the power generator 505 are separate bodies, but a motor generator in which the motor and the power generator are integrated may be adopted.

The friction brake mechanisms (brake means) BK1 to BK4 are arranged at positions adjacent to each wheel W, and respectively include a brake disc D that integrally rotates with each wheel W and a brake pad (not shown) on the brake disc D. The wheel cylinder WC generates the hydraulic pressure (wheel pressure), based on a master pressure generated by the master cylinder 23, and pushes the brake pad against the brake disc D to generate a friction braking force.

The pedal stroke sensor 21a detects an operation amount (stroke) of the brake pedal 21, and outputs the detection signal to the brake ECU 6. The brake ECU 6 computes a "required braking force" of the driver, based on the detection signal from the pedal stoke sensor 21a. The required braking force is a required value of the braking force to be applied to the wheel W corresponding to the brake operation (the operation amount and the operation speed).

The brake ECU 6 determines whether or not the regenerative brake can be activated based on an electrical storage state, the motor state, the current flow state, and the like, and transmits the required braking force to the hybrid ECU 9 as the "target regenerative braking force" when determining that the regenerative brake can be activated. The hybrid ECU 9 executes a regenerative control based on the target regenerative braking force, detects (computes) the regenerative braking force at this time, and transmits the detected regenerative braking force to the brake ECU 6 as an "executing regenerative braking force". The brake ECU 6 assumes a difference of the required braking force and the executing regenerative braking force as a "target hydraulic pressure braking force", and controls the brake actuator 25, based on the target hydraulic pressure braking force.

Briefly describing the configuration of the hydraulic pressure braking device A, the brake pedal 21 is a brake operation member for the driver to carry out the brake operation. The negative pressure booster 22 is a booster that acts an intake negative pressure of the engine 501 on a diaphragm to assist the brake operation force generated by the pressing operation of the brake pedal 21 and to boost the force. The master cylinder 23 is a member that supplies a brake fluid to the brake actuator 25 according to the operation amount (the stroke) of the brake pedal 21. The reservoir tank 24 is an atmospheric pressure reservoir that stores the brake fluid and resupplies the brake fluid to the master cylinder 23. The brake actuator 25 is an actuator arranged between the master cylinder 23 and the wheel cylinder WC, and is a device that adjusts the braking hydraulic pressure to be applied to each wheel cylinder WC1 to WC4. The brake ECU 6 is an electronic control unit that mainly controls the brake actuator 25.

Figure 2:
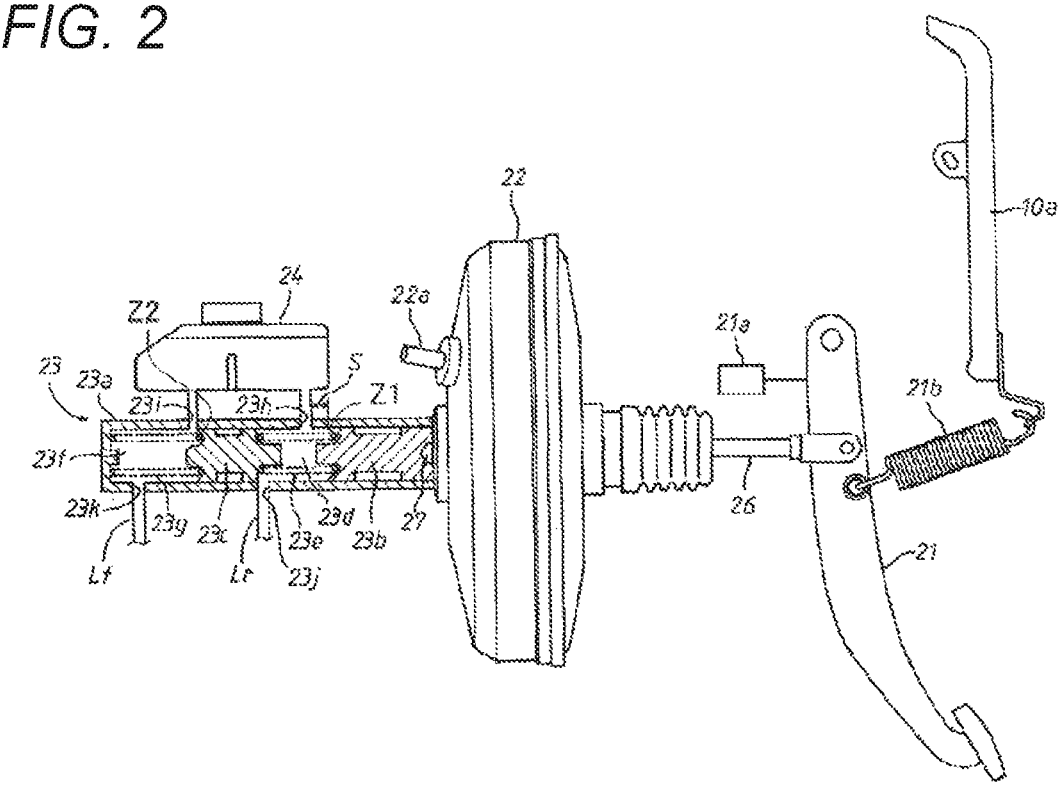
FIG. 2 is an explanatory view describing a master cylinder of the present embodiment.
Figure 3:
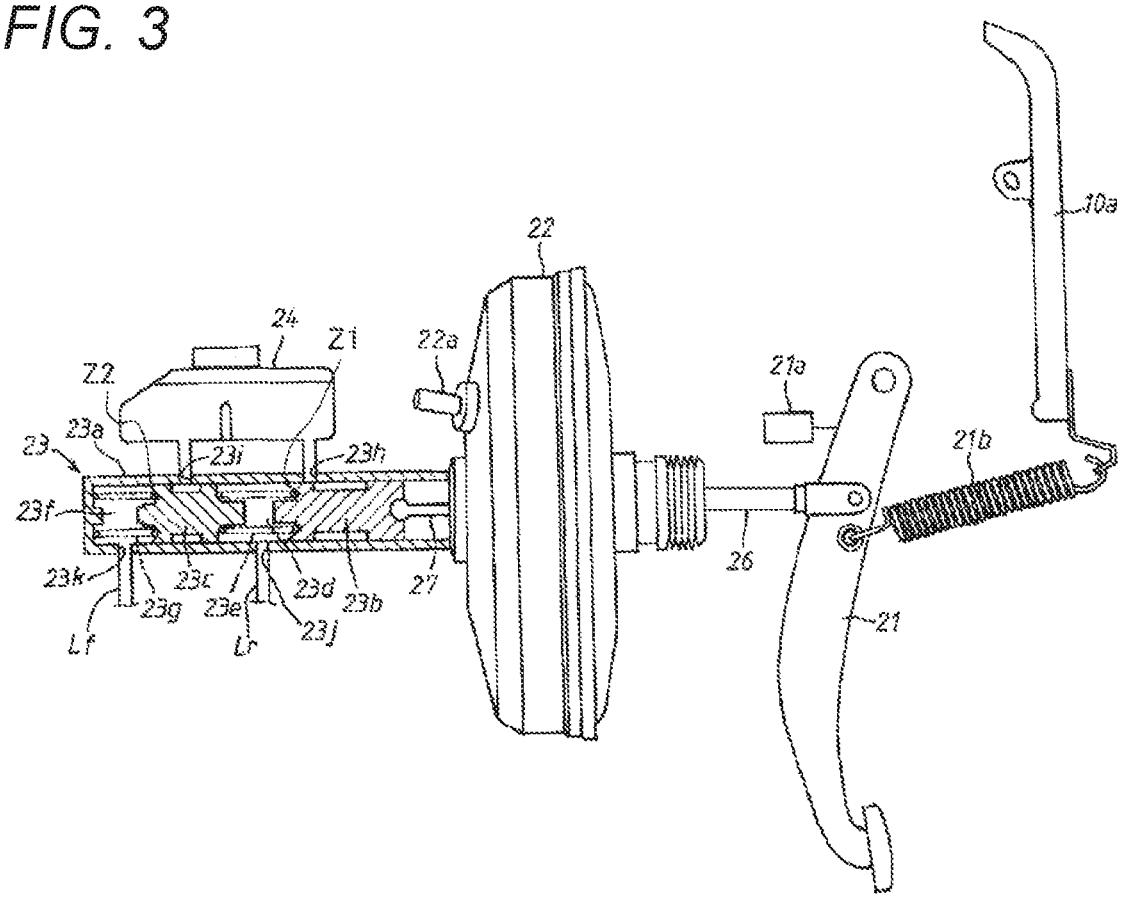
FIG. 3 is an explanatory view describing the master cylinder of the present embodiment.

Specifically, as shown in FIGS. 2 and 3, the brake pedal 21 is connected to the negative pressure booster 22 through an operating rod 26. The negative pressure booster 22 is connected to the master cylinder 23 through a push rod 27. The brake operation force acted on the brake pedal 21 is input to the negative pressure booster 22 through the operating rod 26 to be boosted, and is then input to the master cylinder 23 through the push rod 27.

The brake pedal 21 includes a pedal stroke sensor 21a that detects the stroke, that is, the brake operation amount. The brake pedal 21 includes a reactive force spring (a pedal reactive force generating means) 21b that generates a pedal reactive force of the brake pedal 21 until the stroke (the brake operation amount) becomes a predetermined amount (corresponding to a "first brake operation amount"). The reactive force spring 21b has one end connected to a bracket 10a fixed to a vehicle body of the vehicle, and is configured to bias the brake pedal 21 in a press releasing direction, which is an opposite direction with respect to the pressing direction. The biasing force of the reactive force spring 21b is desirably set in view of the inner diameter, the force boosting ratio, and the like of a housing 23a of the master cylinder 23.

The negative pressure booster 22 is generally well known, and has a negative pressure inlet 22a communicating to an intake manifold of the engine 501 and adopts the negative pressure of the intake manifold as a force boosting source.

As shown in FIGS. 2 and 3, the master cylinder 23 is a tandem type master cylinder, and includes the housing 23a formed to a bottomed tubular shape, first and second pistons 23b, 23c accommodated side by side in a liquid tight and slidable manner in the housing 23a, a first spring 23e arranged in a first hydraulic pressure chamber (corresponding to the "master chamber") 23d formed between the first piston 23b and the second piston 23c, and a second spring 23g arranged in a second hydraulic pressure chamber (corresponding to the "master chamber") 23f formed between the second piston 23c and a closed end of the housing 23a. Hereinafter, the closed end side of the housing 23a is assumed as a front side, and an opened end side is assumed as a back side in the description. The second piston 23c is biased toward the back side by the second spring 23g, the first piston 23b is biased toward the back side by the first spring 23e, and the back end of the first piston 23b is brought into contact while being pressed against a distal end of the push rod 27. The hydraulic pressure in the first hydraulic pressure chamber 23d and the hydraulic pressure in the second hydraulic pressure chamber 23f are master pressures.

The housing 23a includes a first port 23h for communicating the first hydraulic pressure chamber 23d and the reservoir tank 24, and a second port 23i for communicating the second hydraulic pressure chamber 23f and the reservoir tank 24. The back end of the first port 23h is located at a second position spaced apart toward the front side from the first position by a predetermined distance S. As shown in FIG. 2, the first position is a position where a distal end Z1 in an outer peripheral part of the first piston 23b for closing the port 23h is located in a state where the brake pedal 21 is not operated. As shown in FIG. 2, the back end of the second port 23i is arranged at a location where a distal end Z2 of an outer peripheral part of the second piston 23c is located in a state where the brake pedal 21 is not operated. When a forward moving amount (a value corresponding to the stroke) of the first piston 23b reaches a value in which a diameter (front-to-rear width) of the first port 23h is added to the predetermined distance S, the first port 23h is closed by the first piston 23h. That is, when the stroke exceeds a "predetermined amount" corresponding to the sum of the predetermined distance S and the diameter of the first port 23h, the first port 23h is closed.

The predetermined amount is set based on a maximum regenerative braking force (a limit value of the regenerative braking force not dependent on the vehicle speed) that is generable by the regenerative braking device A. The predetermined amount is set to suppress the generation of the master pressure and to maximally exert the regenerative braking force. Therefore, the predetermined amount is set to, for example, a stroke the required braking force determined by the brake operation becomes the same value as the maximum regenerative braking force. When the stroke exceeds the predetermined amount, the first port 23h and the second port 23i are closed, and the master pressure corresponding to the subsequent stroke change and the like is generated in the first hydraulic pressure chamber 23d and the second hydraulic pressure chamber 23f. This state can be referred to as a state where the limit on the generation of the braking force by the master pressure is resolved and the master pressure corresponding to the stroke is reflected on the wheel pressure (the hydraulic pressure of wheel cylinders WC1 to WC4). The predetermined distance S is desirably set so that the regenerative braking device A generates the maximum regenerative braking force when the stroke is the predetermined amount.

Figure 4:
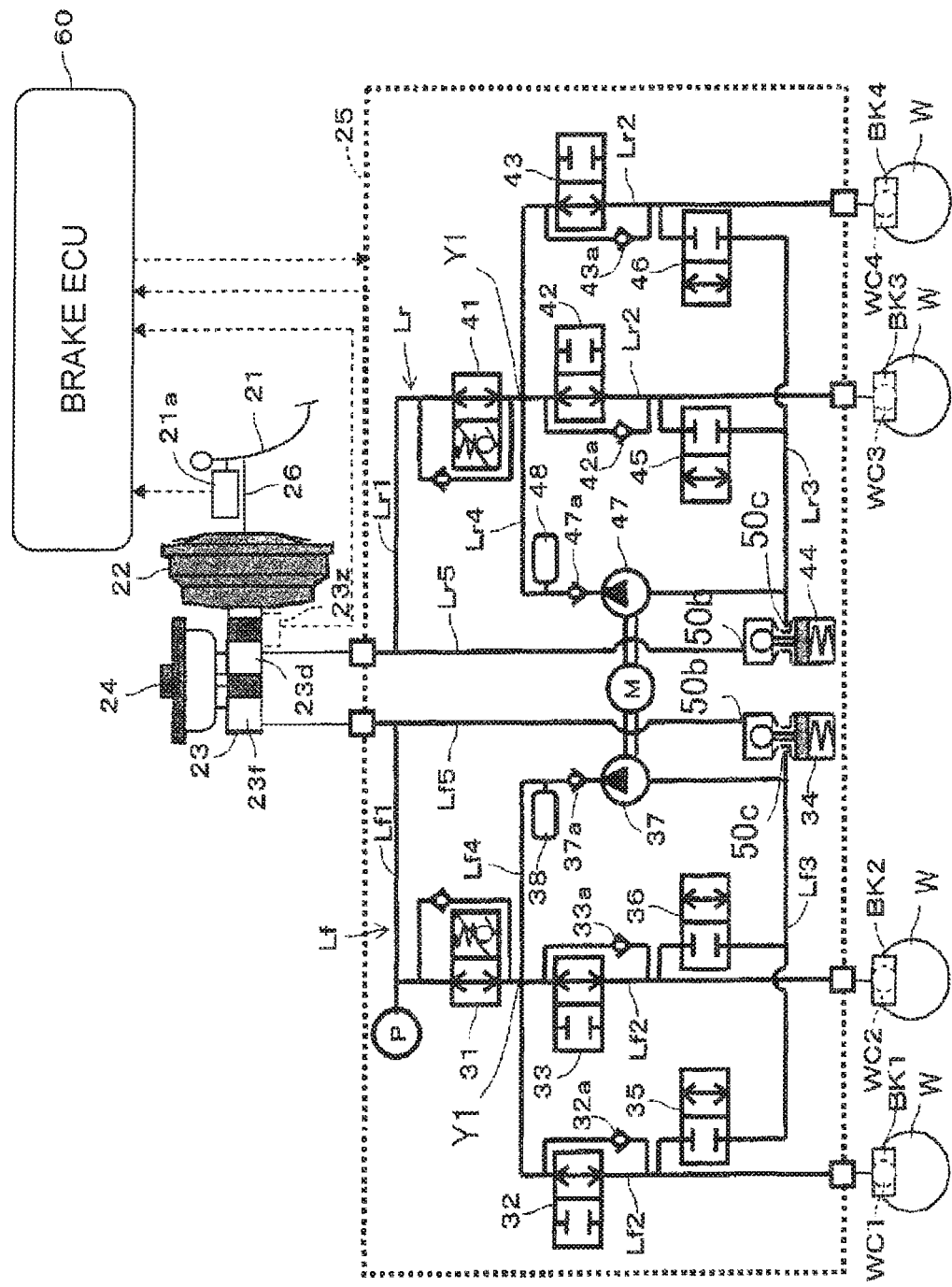
FIG. 4 is a configuration view showing a configuration of a brake actuator of the present embodiment.

Furthermore, the housing 23a includes a third port 23j for communicating the first hydraulic pressure chamber 23d and an oil path Lr configuring a rear wheel system, and a fourth port 23k for communicating the second hydraulic pressure chamber 23f and an oil path Lf configuring a front wheel system. As shown in FIG. 4, the oil path Lr is a flow path connecting the first hydraulic pressure chamber 23d and the wheel cylinders WC3, WC4 of the left and right rear wheels RR, RL, respectively. The oil path Lf is a flow path connecting the second hydraulic pressure chamber 23f and the wheel cylinders WC1, WC2 of the left and right front wheels FR, FL.

When supplied with the hydraulic pressure, each wheel cylinder WC1 to WC4 activates each friction brake mechanism BK1 to BK4 arranged thereon to apply a hydraulic pressure braking force to each wheel W. The friction brake mechanism BK1 to BK4 may be, for example, a disc brake, a drum brake, or the like. The brake actuator 25 will be described later.

The activation of the master cylinder 23 will now be described with reference to FIGS. 2 and 3. As shown in FIG. 2, in a state where the brake pedal 21 is not pressed, the operating rod 26 and the push rod 27 are not pushed and are not moved. In this case, the first piston 23b and the second piston 23c are also not pushed, and hence the master pressure is not generated in the first and second hydraulic pressure chambers 23d, 23f.

When the brake pedal 21 is pressed, the operating rod 26 and the push rod 27 are pushed, and the first piston 23b is pushed. Until the first piston 23b is pushed by the push rod 27 and moved toward the front side by a distance greater than or equal to the predetermined distance S, the closing by the outer peripheral part of the first piston 23b is not started with respect to the first port 23h. Thus, the brake fluid in the first hydraulic pressure chamber 23d is flowed out to the reservoir tank 24 through the first port 23h, and the master pressure is not generated in the first hydraulic pressure chamber 23d. Furthermore, the first spring 23e is pushed and compressed by the movement of the first piston 23b, but the second piston 23c is not pushed toward the front side and remains stopped at the first position because the master pressure is not generated in the first hydraulic pressure chamber 23d. Since the master pressure is also not generated in the second hydraulic pressure chamber 23f, the closing by the outer peripheral part of the second piston 23c is not started with respect to the second port 23i.

When the first piston 23b is moved toward the front side by the value in which the diameter of the first port 23h is added to the predetermined distance S, the first port 23h is closed by the outer peripheral part of the first piston 23b, and the brake fluid in the first hydraulic pressure chamber 23d cannot flow out to the reservoir tank 24 through the first port 23h. Thus, the first hydraulic pressure chamber 23d is in a sealed state, and the generation of the master pressure is started in the first hydraulic pressure chamber 23d. Furthermore, since the second piston 23c is push toward the front side by the master pressure generated in the first hydraulic pressure chamber 23d, and the second port 23i is closed by the outer peripheral part immediately thereafter, the brake fluid in the second hydraulic pressure chamber 23f cannot flow out to the reservoir tank 24 through the second port 23i. Thus, the second hydraulic pressure chamber 23f is in the sealed state, and the generation of the master pressure is also started in the second hydraulic pressure chamber 23f.

Thus, when the brake pedal 21 is further pressed from the state where the generation of the master pressure is started in the first and second hydraulic pressure chambers 23d, 23f, thereby being in a pressed state shown in FIG. 3, the master pressure corresponding to the brake operation is generated in the first and second hydraulic pressure chambers 23d, 23f. Each master pressure generated in each of the first and second hydraulic pressure chambers 23d, 23f becomes the same pressure. When the foot is released from the brake pedal 21 in the pressed state shown in FIG. 3, the first and second pistons 23b, 23c are returned to the original positions (first position) by the biasing force of the first and second springs 23e, 23g and the pressure in each oil path Lr, Lf, respectively.

Figure 5:
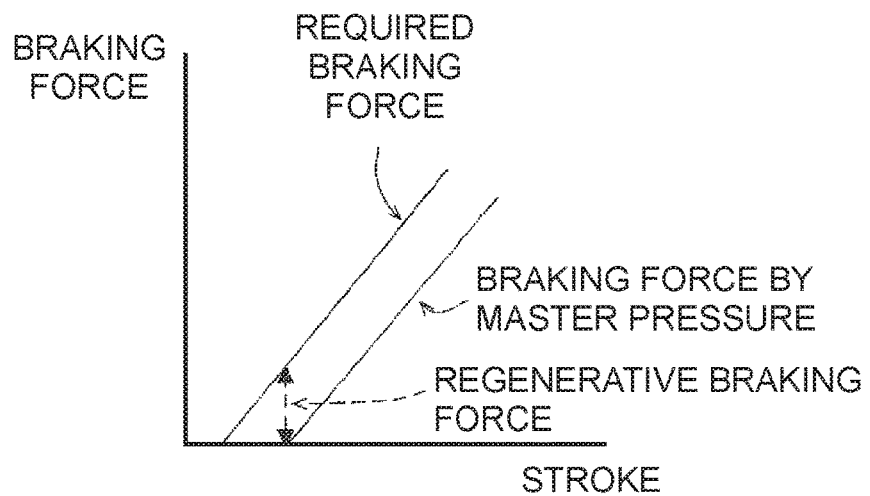
FIG. 5 is an explanatory view describing one example of a relationship of a braking force and a stroke.

The relationship of the braking force by the master pressure and the stroke is as shown with a solid line in FIG. 5. In other words, when the brake pedal stroke is located between a pressing start position and a position of closing the first port 23h, the master pressure generated in the first and second hydraulic pressure chambers 23d, 23f of the master cylinder 23 is limited to zero, and thus the generation of the braking force by the master pressure is also limited to zero. When the brake pedal stroke is located at a position beyond the position of closing the first port 23h, the limit on the generation of the master pressure described above is resolved, and the master pressure generated in the first and second hydraulic pressure chambers 23d, 23f corresponds to the brake pedal stroke. Thus, the braking force by the master pressure also corresponds to the stroke. That is, the braking device for the vehicle of the present embodiment is configured such that the generation of the master pressure is suppressed until the stroke reaches the predetermined amount. The brake ECU 6 generates the wheel pressure corresponding to the difference between the required braking force and the executing regenerative braking force, and generates the hydraulic pressure braking force by the activation of the brake actuator 25 during a period when the generation of the master pressure is suppressed.

As shown in FIG. 4, the brake actuator 25 includes differential pressure control valves 31, 41, pressure intensifying control valves 32, 33, 42, 43 and pressure reducing control valves 35, 36, 45, 46 that are included in a ABS control valve, pressure adjusting reservoirs 34, 44, pumps 37, 47, and a motor M.

First, the configuration of the front wheel system of the brake actuator 25 will be described. The hydraulic pressure control valve (corresponding to the "differential pressure valve") 31 is arranged on the oil path Lf, and is configured as a differential pressure control valve. The differential pressure control valve 31 is an electromagnetic valve capable of switch-controlling between a communicated state and a differential pressure state (the throttle state) by the brake ECU 6. The differential pressure control valve 31 is a constantly opened valve that is in the communicated state in a non-current flowing state. When the differential pressure control valve 31 is controlled to the differential pressure state and the pump 37 is driven, the oil path Lf2 on its wheel cylinder WC1, WC2 side can be held at a pressure higher by the controlled differential pressure than the oil path Lf1 on the master cylinder 23 side. This differential pressure is controlled by the control current by the brake ECU 6.

The oil path Lf2 is branched into two at a branching point Y1, where the wheel cylinder WC1 is connected to one oil path by way of the pressure intensifying control valve 32 and the wheel cylinder WC2 is connected to the other oil path by way of the pressure intensifying control valve 33. The pressure intensifying control valves 32, 33 are, for example, electromagnetic valves for controlling the pressure intensifying of the wheel pressure at the time of a pressure intensifying mode of the ABS control. The pressure intensifying control valves 32, 33 are configured as two-position valves whose communicated/shielded state can be controlled by the brake ECU 6. When the pressure intensifying control valves 32, 33 are controlled to be in the communicated state, the master pressure of the master cylinder 23 and/or the controlled hydraulic pressure generated by the drive of the pump 37 and the control of the differential pressure control valve 31 can be applied to each wheel cylinder WC1, WC2.

Furthermore, the pressure intensifying control valves 32, 33 can execute the ABS control together with the pressure reducing control valves 35, 36 and the pump 37.

In the normal brake in which the ABS control is not executed, the pressure intensifying control valves 32, 33 are controlled to be in the communicated state on a steady basis. The pressure intensifying control valves 32, 33 are constantly opened valves that are opened in the non-current flowing state. Safety valves 32a, 33a are provided in parallel on the pressure intensifying control valves 32, 33, respectively. Such configurations are configured such that when the brake pedal 21 is released at the time of the ABS control, the brake fluid from the wheel cylinders WC1, WC2 side is returned to the reservoir tank 24 accompanying therewith.

A portion between the pressure intensifying control valve 32, 33 on the oil path Lf2 and each wheel cylinder WC1, WC2 is connected to a reservoir hole 50c of the pressure adjusting reservoir 34 by way of the oil path Lf3. The pressure reducing control valves 35, 36 whose communicated/shielded state can be controlled by the brake ECU 6 are respectively arranged on the oil path Lf3. The pressure reducing control valves 35, 36 are in a shielded state on a steady basis in the normal brake state (at the time of non-activation of ABS). The brake ECU 6 escapes the brake fluid to the pressure adjusting reservoir 34 from the wheel cylinders WC1, WC2 through the oil path Lf3 with the pressure reducing control valves 35, 36 appropriately being in the communicated state to control the wheel pressure and to prevent the wheel W from tending to be locked.

The pump 37 is arranged with the safety valve 37a on an oil path Lf4 connecting the portion between the differential pressure control valve 31 and the pressure intensifying control valves 32, 33 on the oil path Lf2 and the reservoir hole 50c of the pressure adjusting reservoir 34. Furthermore, an oil path Lf5 connecting the reservoir hole 50b of the pressure adjusting reservoir 34 to the master cylinder 23 by way of the oil path Lf1 is arranged in the brake actuator 25. The pump 37 is driven by the motor M according to a command of the brake ECU 6. The pump 37 takes in the brake fluid in the wheel cylinders WC1, WC2 or the brake fluid stored in the pressure adjusting reservoir 34, and returns the brake fluid to the master cylinder 23 through the differential pressure control valve 31 being in the communicated state, at the time of the pressure reducing mode of the ABS control. Furthermore, when generating the controlled hydraulic pressure, the pump 37 takes in the brake fluid in the master cylinder 23 through the oil paths Lf1, Lf5 and the pressure adjusting reservoir 34, and discharges the brake fluid to each wheel cylinder WC1, WC2 through the oil paths Lf4, Lf2 and the pressure intensifying control valves 32, 33 being in the communicated state, to generate a differential pressure corresponding to the differential pressure state of the differential pressure control valve 31 by the control of the brake ECU 6. The time when generating the controlled hydraulic pressure includes the time of control for stably controlling the orientation of the vehicle such as VSC control, traction control, brake assist, and the like, the time in which the executing regenerative braking force does not satisfy the required braking force, and the like. An accumulator 38 is arranged upstream of the pump 37 on the oil path Lf4 to reduce the pulsation of the brake fluid discharged by the pump 37.

A pressure sensor P that detects the master cylinder pressure, which is the brake fluid pressure in the master cylinder 23, is arranged on the oil path Lf1. A detection signal of the pressure sensor P is transmitted to the brake ECU 6. The pressure sensor P may be arranged on the oil path Lr1.

The rear wheel system of the brake actuator 25 has a configuration similar to that of the front wheel system described above. The oil path Lr configuring the rear wheel system includes oil paths Lr1 to Lr5, as with the oil path Lf. A differential pressure control valve 41 similar to the differential pressure control valve 31, and a pressure adjusting reservoir 44 similar to the pressure adjusting reservoir 34 are arranged on the oil path Lr. The pressure intensifying control valves 42, 43 similar to the pressure intensifying control valves 32, 33 are arranged on each branched oil path Lr2, Lr2 connected to the wheel cylinders WC3, WC4, and the pressure reducing control valves 45, 46 similar to the pressure reducing control valves 35, 36 are arranged on the oil path Lr3. A pump 47, a safety valve 47a, and an accumulator 48 similar to the pump 37, the safety valve 37a, and the accumulator 38 are arranged on the oil path Lr4. Safety valves 42a, 43a similar to the safety valves 32a, 33a are arranged in parallel on the pressure intensifying control valves 42, 43.

The hydraulic pressure braking device B can generate the hydraulic pressure braking force at each wheel W by applying the controlled hydraulic pressure generated by the drive of the pump 37, 47 and the control of the differential pressure control valve 31, 41 to the wheel cylinder WC1, WC2, WC3, WC4 of each wheel W. The "oil path" in the description can be rewritten as hydraulic pressure path, flow path, tube path, hydraulic pressure circuit, piping, or the like. The detailed configuration of the pressure adjusting reservoir 34, 44 is the same as that of the known ABS reservoir, and thus the description thereof will be omitted. Furthermore, although illustrated with a dotted line in FIG. 4, a master cylinder stroke sensor 23z may be arranged (not arranged in the present embodiment) in the master cylinder 23.

(Brake Control of Present Embodiment)

Thus, the braking device for the vehicle of the present embodiment includes the hydraulic pressure braking device B that applies, to the wheel W of the vehicle, the braking force corresponding to the hydraulic pressure of the wheel cylinders WC1 to WC4, and the regenerative braking device A that applies, to the wheel W, the regenerative braking force obtained by converting the kinetic energy of the wheel W to the electrical energy. The hydraulic pressure braking device B includes the differential pressure control valve 31, 41 arranged on the oil paths (corresponding to a "hydraulic pressure path") Lf, Lr connecting the hydraulic pressure chambers 23d, 23f of the master cylinder 23 and the wheel cylinders WC1 to WC4, and the pumps 37, 47 that discharge the brake fluid to the portion between the differential pressure control valves 31, 41 and the wheel cylinders WC1 to WC4 in the oil paths Lf, Lr. The braking device for the vehicle of the present embodiment is configured to generate the master pressure corresponding to the brake operation amount (the stroke) in the master chamber 23d, 23f, to adjust the differential pressure (hereinafter also referred to as the "first differential pressure") of the master chamber 23d, 23f side of the differential pressure control valve 31, 41 and the wheel cylinder WC1 to WC4 side, and to suppress the generation of the master pressure until the brake operation amount reaches the predetermined amount (the first brake operation amount) while activating the pump 37, 47. The predetermined amount is set based on the maximum regenerative braking force that is generable by the regenerative braking device A.

The control carried out by the brake ECU 6 from when the brake operation is started until the stroke exceeds a predetermined amount, that is, while the generation of the master pressure is suppressed (hereinafter also referred to as the "master pressure suppressing zone") will be described. The brake ECU 6 and the hybrid ECU 9 execute the regenerative cooperation control. As described above, the brake ECU 6 computes the required braking force and the target regenerative braking force and transmits them to the hybrid ECU 9, and the hybrid ECU 9 computes the executing regenerative braking force and transmits it to the brake ECU 6. The brake ECU 6 sets a difference between the required braking force and the executing regenerative braking force as the target hydraulic pressure braking force, and controls the brake actuator 25, based on the target hydraulic pressure braking force. The differential pressure state of the differential pressure control valve 31, 41 is determined based on the master pressure (the detected value of the pressure sensor P) and the target hydraulic pressure braking force. In the master pressure suppressing zone of the present embodiment in which the master pressure is limited to zero, the wheel pressure (target wheel pressure) necessary to exert the target hydraulic pressure braking force is controlled by the control of the first differential pressure generated in the differential pressure control valve 31, 41.

The brake ECU 6 controls the brake actuator 25, based on two relationships set in advance in the master pressure suppressing zone. Specifically, the brake ECU 6 includes a storage unit 61 and a control unit 62. The control unit 62 executes the brake control and the regenerative cooperation control. Details of the control unit 62 will be described later.

The storage unit 61 is a nonvolatile memory, and stores a first relationship f1 and a second relationship f2. The first relationship f1 is a relationship between the stroke and the first differential pressure when the stroke is in a range smaller than a predetermined amount (i.e., the master pressure suppressing zone) and is increasing. The second relationship f2 is a relationship between the stroke and the first differential pressure when the stroke is in a range smaller than the predetermined amount and is reducing. The first relationship f1 and the second relationship f2 are set and stored in, for example, a form of relational expression, map, or the like. The first relationship f1 and the second relationship f2 of the present embodiment are stored in the storage unit 61 in the map form.

The first relationship f1 is set to a relationship in which the first differential pressure increases as the stroke increases. The second relationship f2 is set to a relationship in which the first differential pressure reduces as the stroke reduces. A reduction width of the first differential pressure per unit reduction width of the stroke in the second relationship f2 is set to be greater than an increase width of the first differential pressure per unit increase width of the stroke in the first relationship f1. That is, in the master pressure suppressing zone, a pressure decrease gradient with respect to the stroke can be said as being greater than the pressure intensification gradient with respect to the stroke.

In the master pressure suppressing zone, the control unit 62 controls the differential pressure control valves 31, 41, based on the first relationship f1 and the second relationship f2 stored in the storage unit 61. That is, in controlling the first differential pressure, the brake ECU 6 of the present embodiment uses a different relational expression or a map for the time of pressurization control (the time of pressure intensifying control) and the time of pressure reducing control by the brake actuator 25 in the master pressure suppressing zone.

The control unit 62 determines the brake operation state, based on the detection result of the pedal stroke sensor 21a. The control unit 62 determines whether the brake operation state is "the pedal being pressed" or "the pedal being returned", based on, for example, two or more successive detection results (the temporal change) from the pedal stroke sensor 21a. In the master pressure suppressing zone, the control unit 62 uses the first relationship f1 when determined as the pedal being pressed, and uses the second relationship f2 when determined as the pedal being returned. Thus, in the master pressure suppressing zone, the control unit 62 selects either one of the first relationship f1 and the second relationship f2 according to the brake operation state, and controls the differential pressure control valve 31, 41, based on the first relationship or the second relationship, which is the selected relationship. The storage unit 61 also stores a relationship (e.g., the third relationship) of when the stroke is greater than or equal to the predetermined amount, and the control unit 62 executes the brake control, based on the third relationship, and the like when the stroke is greater than or equal to the predetermined amount.

Figure 6:
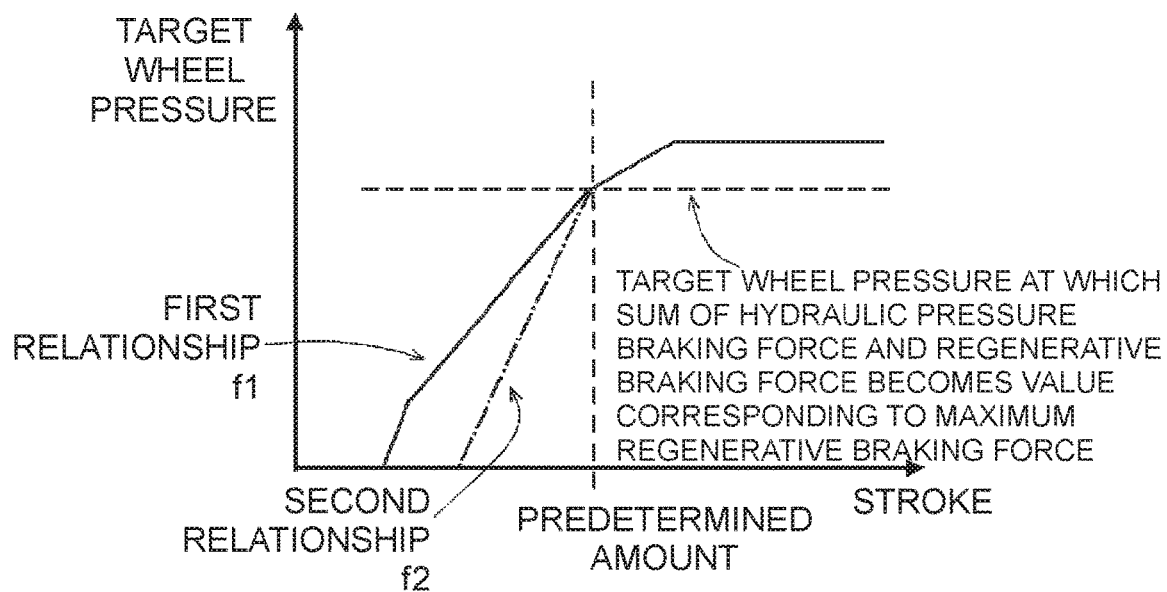
FIG. 6 is an explanatory view describing a control example of a wheel pressure of the present embodiment.
Figure 7:
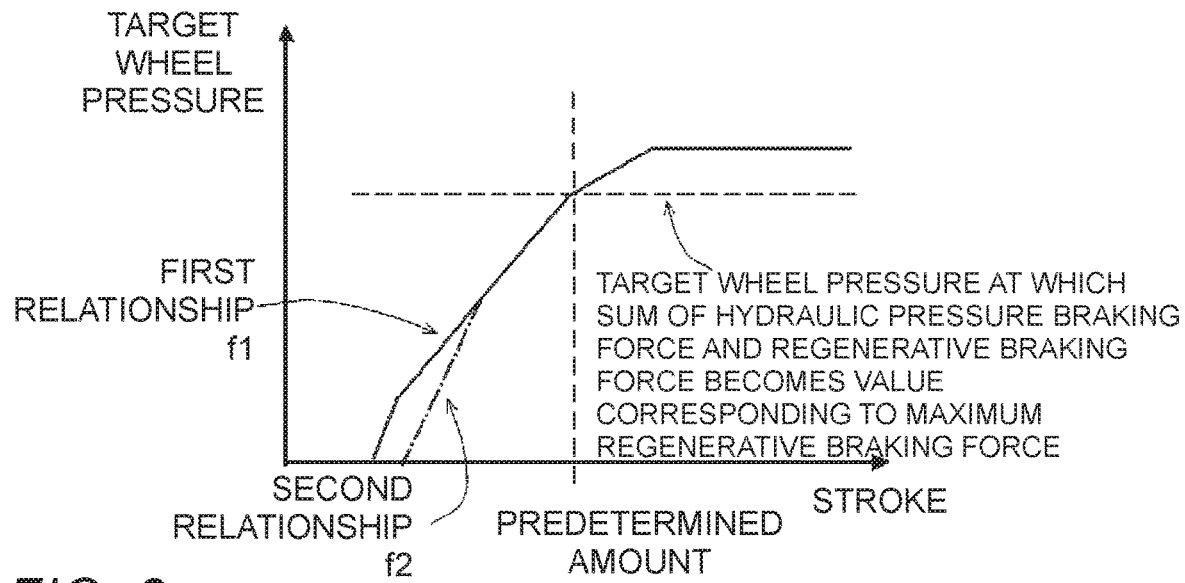
FIG. 7 is an explanatory view describing the control example of a wheel pressure of the present embodiment.
Figure 8:
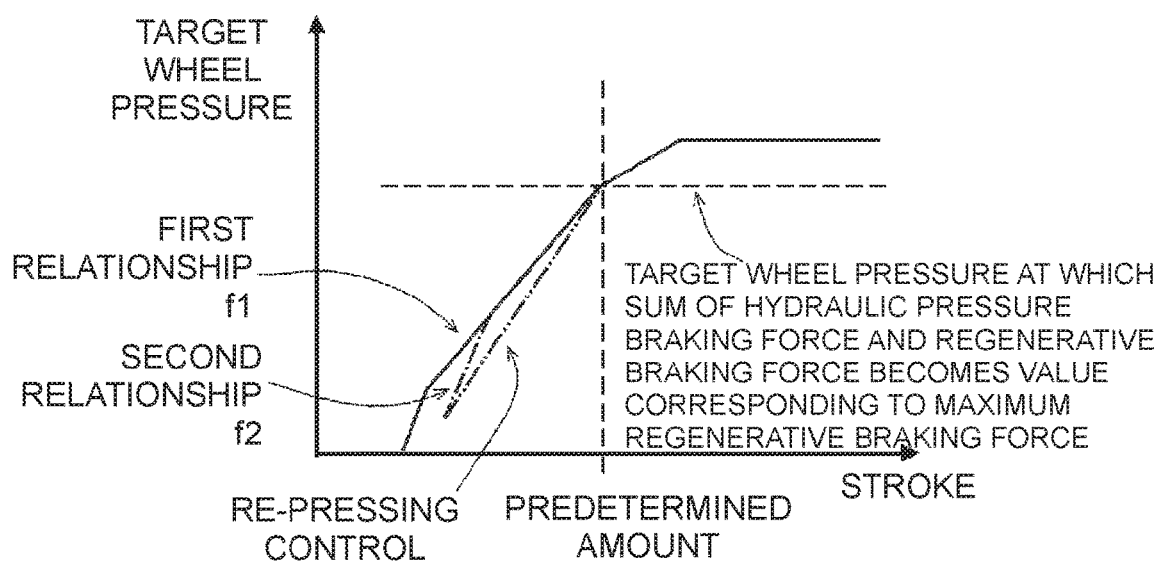
FIG. 8 is an explanatory view describing the control example of a wheel pressure of the present embodiment.

A modification of the target wheel pressure with respect to the stroke is shown in FIGS. 6 to 8. The target wheel pressure is a value in which the target hydraulic pressure braking force is converted to a wheel pressure, and corresponds to the first differential pressure because the master pressure is zero in the master pressure suppressing zone. That is, FIGS. 6 to 8 show a relationship between the stroke and the first differential pressure (a control value set by the control unit 62) in a range where the stroke is smaller than the predetermined amount. When the stroke becomes greater than or equal to the predetermined amount, the generated master pressure influences the wheel pressure.

As shown with the solid line of FIG. 6, the first differential pressure (the target wheel pressure) is increased based on the first relationship f1 with respect to the pressing of the brake pedal 21, and the target wheel pressure is increased based on the third relationship when the stroke becomes greater than or equal to the predetermined amount. When the brake pedal 21 is returned from the state where the stroke is greater than or equal to the predetermined amount, the target wheel pressure is reduced based on the third relationship until the stroke becomes smaller than the predetermined amount (see the solid line in FIG. 6), and the first differential pressure is reduced based on the second relationship f2 when the stroke becomes smaller than the predetermined amount (see the one-dot chain line in FIG. 6).

Furthermore, as shown in FIG. 7, when the brake pedal 21 is pressed and the brake pedal 21 is returned before the stroke reaches the predetermined amount, the first differential pressure increased based on the first relationship f1 is reduced based on the second relationship f2 (see the one-dot chain line in FIG. 7).

Furthermore, as shown in FIG. 8, when the brake pedal 21 is pressed, the brake pedal 21 is returned before the stroke reaches the predetermined amount, and the brake pedal is again pressed before completely returning, the first differential pressure carries out the operation similar to FIG. 7 until the brake pedal 21 is again pressed. After the brake pedal 21 is pressed again, the first differential pressure is increased, as shown with the two-dot chain line of FIG. 8, according to the increase of the stroke so that the sum of the hydraulic pressure braking force generated by the first differential pressure (wheel pressure) and the executing regenerative braking force becomes a value corresponding to the maximum regenerative braking force. The executing regenerative braking force in this case corresponds to a maximum value of the regenerative braking force that depends on the vehicle speed (the wheel speed).

When the brake pedal 21 is pressed again before the stroke becomes zero, the control unit 62 calculates the first differential pressure with respect to the stroke so that the sum of the hydraulic pressure braking force generated by the first differential pressure (wheel pressure) and the executing regenerative braking force becomes a value corresponding to the maximum regenerative braking force, and increases the first differential pressure (the indicated pressure) according to the calculated value. That is, when the brake pedal is again pressed in the master pressure suppressing zone, the control unit 62 newly calculates the first differential pressure (the indicated pressure) for the braking force corresponding to the maximum regenerative braking force to be exerted when the stroke reaches the predetermined amount, and executes the rewrite of the first relationship f1 or the pressurization control regardless of the first relationship f1. As shown in FIG. 8, the increase gradient with respect to the stroke of the first differential pressure in this case is greater than that at the time of the application of the first relationship f1. The control at the time of re-pressing is also referred to as the "re-pressing control". The re-pressing control is carried out in the master pressure suppressing zone, and is similarly carried out when the stroke once exceeds the predetermined amount as shown in FIG. 6.

Figure 9:
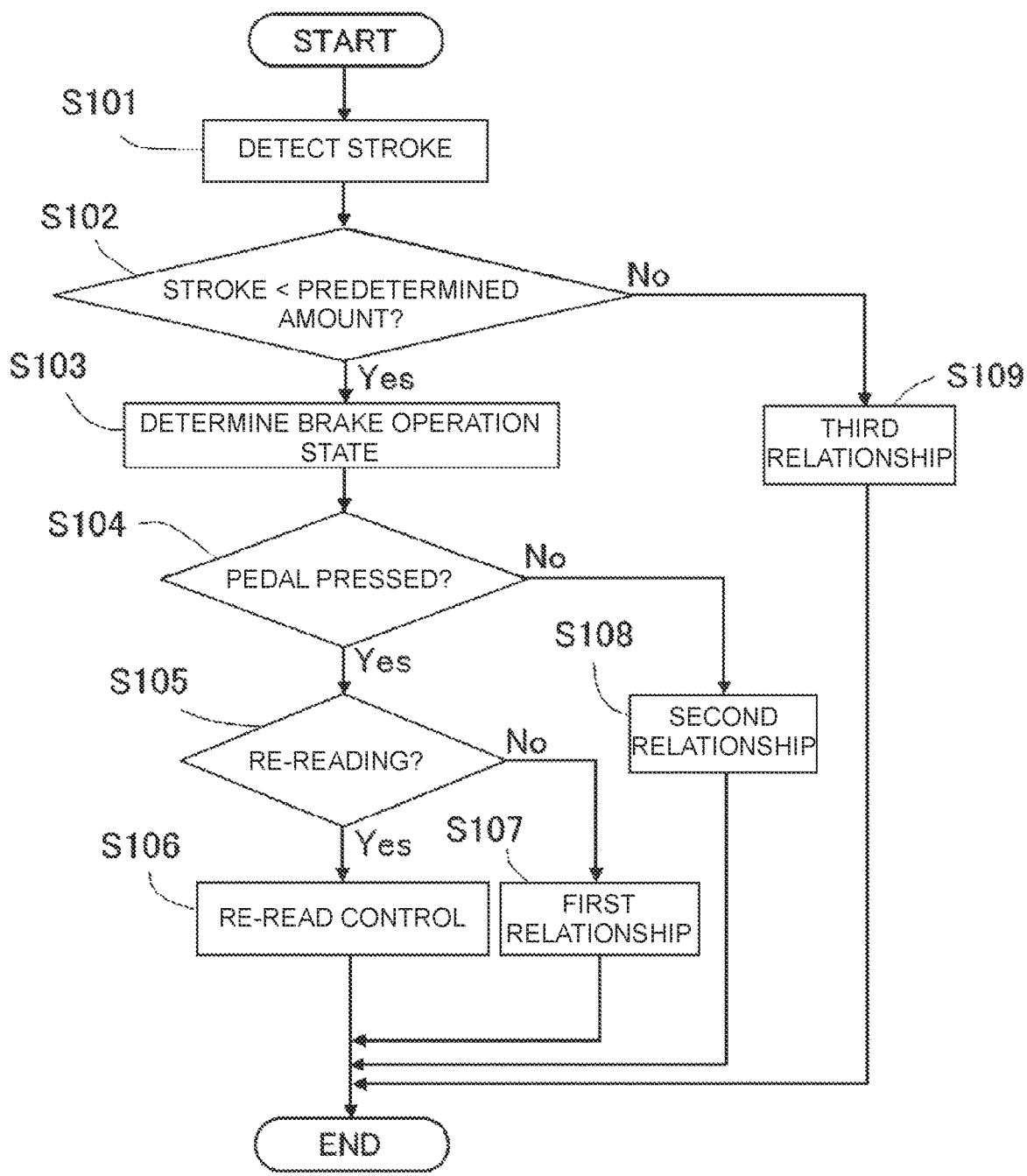
FIG. 9 is a flowchart describing a flow of control of the present embodiment.

The flow of control will be briefly described. As shown in FIG. 9, the control unit 62 acquires stroke information from the pedal stroke sensor 21a (S101). The control unit 62 determines whether or not the stroke is smaller than the predetermined amount (S102). When the stroke is smaller than the predetermined amount (S102: Yes), the control unit 62 determines a brake operation state (S103). When the brake operation state is the pedal being pressed (S104: Yes), the control unit 62 determines whether or not it is re-pressing of the pedal (S105). When the brake operation state is the re-pressing state of the pedal (S105: Yes), a re-pressing control is executed (S106).

When the brake operation state is not the re-pressing state (S105: No), the control unit 62 controls the differential pressure control valve 31, 41 and controls the first differential pressure, based on the first relationship f1 stored in the storage unit 61 (S107). When the brake operation state is the pedal being returned (S104: No), the control unit 62 controls the differential pressure control valves 31, 41 and controls the first differential pressure, based on the second relationship f2 stored in the storage unit 61 (S108). When the stroke is greater than or equal to the predetermined amount (S102: No), the wheel pressure is controlled based on the third relationship and the like stored in the storage unit 61 (S109). Such controls are carried out every predetermined interval.

According to the present embodiment, when the stroke is reducing (the pedal being returned) in the master pressure suppressing zone, the differential pressure control valve 31, 41 is controlled based on the second relationship f2 in which the change gradient with respect to the stroke is greater than that in the first relationship f1 used when the stroke is increasing (the pedal being pressed). Thus, when the stroke is reducing, the delay in the escape of the actual braking force by the property of the differential pressure control valve 31, 41 is suppressed, and the uncomfortable feeling can be suppressed.

Figure 10:
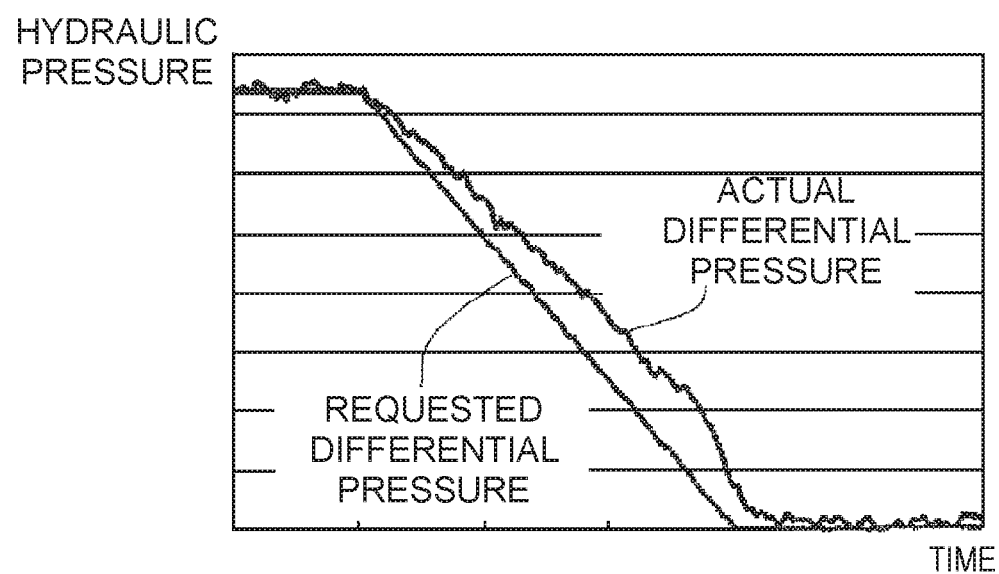
FIG. 10 is an explanatory view describing a property of a differential pressure control valve.

A specific example of the property of the differential pressure control valve 31, 41 during the pressure reduction is shown in FIG. 10. As shown in FIG. 10, during pressure reduction, the actual first differential pressure (the actual differential pressure) becomes greater than the indicated pressure (the requested differential pressure), and the escape of the braking force becomes slow. In particular, since the differential pressure control valve 31, 41 is an electromagnetic valve, the residual magnetic force influences the property in addition to the influence of the slidably moving resistance on the property, and the hysteresis becomes significant. However, according to the present embodiment, for example, the delay in the reduction of the braking force is suppressed, as shown in FIG. 11.

Figure 11:
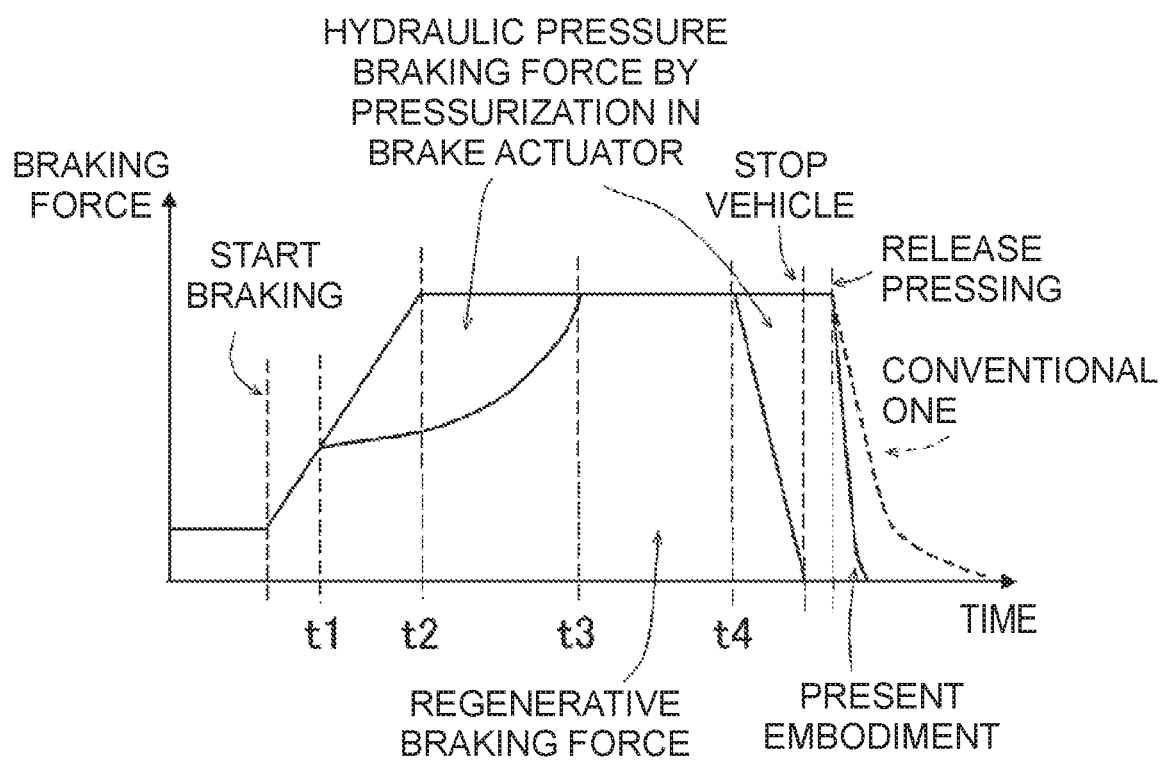
FIG. 11 is an explanatory view describing a control example of the present embodiment.

FIG. 11 is an image diagram of the braking force configuration of when the brake operation (from the pedal pressing operation through the pedal returning operation to zero stroke) is carried out in the master pressure suppressing zone. As shown in FIG. 11, in a relatively high speed region at the beginning of the operation, the required braking force may exceed the maximum value of the regenerative braking force that is generable at this time, and in this case, the pressurization (the pressurization control) of the wheel pressure is executed by the brake actuator 25 (t1 to t3). The stroke is maintained at an amount immediately before reaching the predetermined amount, the braking force corresponding to the maximum regenerative braking force is realized by the sum of the hydraulic pressure braking force and the regenerative braking force, and the hydraulic pressure braking force becomes zero when the vehicle speed (the medium speed region) at which the maximum regenerative braking force can be exerted (t3 to t4). In the low speed region, the maximum value of the regenerative braking force is reduced, and thus a so-called the switch control is executed (after t4). In the low speed region, the pressurization of the wheel pressure is executed by the brake actuator 25 to compensate for the reduction of the regenerative braking force, and the braking force corresponding to the maximum regenerative braking force is maintained. Then, the control unit 62 reduces the first differential pressure according to the second relationship f2 according to the release of the brake operation, that is, according to the reduction of the stroke. Thus, the actual braking force reduces in accordance more with the brake operation, and the generation of a remaining feeling of the braking force is suppressed.

Furthermore, according to the present embodiment, a zone in which two different relationships are selectively used is set while the generation of the master pressure is being suppressed, and thus the fluctuation of the master pressure by the difference in the adjustment of the wheel pressure is also suppressed. The same stroke but a different first differential pressure (the indicated pressure) is set for the first relationship f1 and the second relationship f2, but the fluctuation of the master pressure by the difference in the first differential pressure does not occur because the hydraulic pressure chambers 23d, 23f are opened to the reservoir tank 24 in the master pressure suppressing zone. Since the master pressure does not fluctuate, the brake pedal 21 does not fluctuate against the driver's intention, and the pedal feeling does not change. That is, according to the present embodiment, the uncomfortable feeling by the property of the differential pressure control valve 31, 41 can be suppressed while suppressing the influence on the pedal feeling.

Furthermore, the degree of freedom of control is increased by using two relationships. Therefore, for example, the control design of the braking force can be made to simulate the feeling at the time of the pedal returning operation in the conventional configuration (e.g., the configuration having only the hydraulic pressure braking force by the master pressure as the braking force). According to the present embodiment, the influence on the pedal feeling is also suppressed even in such control designs.

Furthermore, according to the present embodiment, the first differential pressure (the indicated pressure) is increased according to the increase in stroke so that the sum of the hydraulic pressure braking force and the regenerative braking force (the executing regenerative braking force) becomes a value corresponding to the maximum regenerative braking force at the time point when the stroke has reached the predetermined amount. Thus, a skip (the great change) in the required braking force is suppressed, and the smooth change of braking force can be realized.

(Modifications)

Figure 12:
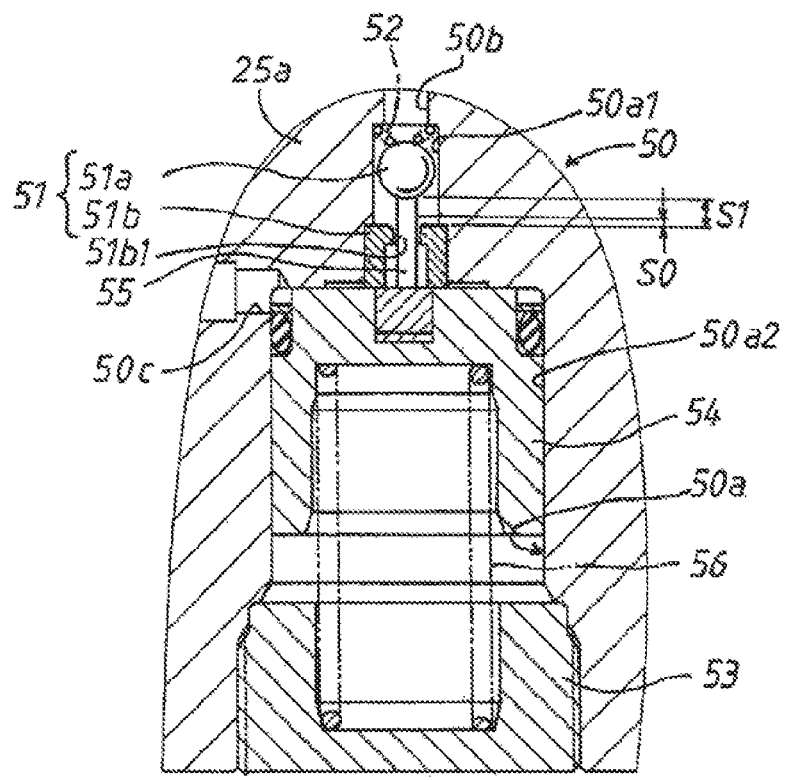
FIG. 12 is an explanatory view describing a pressure adjusting reservoir of a modification of the present embodiment.

The present invention is not limited to the embodiment described above. For example, the configuration of suppressing the generation of the master pressure such as the invalid stroke mechanism, and the like is not limited to one being realized by the configuration of the master cylinder as described above. For example, the configuration of suppressing the generation of the master pressure may be configured by the pressure adjusting reservoir 34, 44 in place of the configuration of the embodiment described above (the configuration of suppressing by the master cylinder 23). When the pressure adjusting reservoir 34 is described as a specific example, as shown in FIG. 12, the pressure adjusting reservoir 34 is configured such that the position of a ball valve 51a becomes a position spaced apart by a predetermined distance S1 in a valve opening direction (the direction in which the ball valve 51a moves away from a valve seat 51b) from a valve closed position when the brake operation is not carried out, and becomes the valve closed position when the stroke reaches a predetermined amount. The valve closed position is the position where the ball valve 51a is brought into contact with the valve seat 51b including the valve hole 51b1 to close the valve hole 51b1. The predetermined distance of the embodiment described above, which is not a modification, can be expressed as, for example, a distance S0 in FIG. 12.

A configuring member 50 of the pressure adjusting reservoir 34 is incorporated in the housing 25a of the brake actuator 25. A part of the housing 25a configures the configuring member 50. A step hole 50a configured by a smaller diameter hole 50a1 and a larger diameter hole 50a2 is formed in the housing 25a. The reservoir hole 50b, to which one end of the oil path Lf5 is connected, is formed at one end (the upper end) of the smaller diameter hole 50a1, and a pressure adjusting valve 51 is arranged at the other end (the lower end) of the smaller diameter hole 50a1. The pressure adjusting valve 51 includes the ball valve 51a, which is the valve body, and the valve seat 51b including the valve hole 51b1. The ball valve 51a is biased toward the valve seat 51b by a spring 52. A reservoir hole 50c, to which one end of the oil path Lf3 is connected, is formed at one end (the upper end) of the larger diameter hole 50a2, and a closing member 53 for closing an opening (the other end) is fixed at the other end of the larger diameter hole 50a2.

The piston 54 is liquid-tightly and slidably accommodated in the larger diameter hole 50a2. A pin 55 is integrally attached to one end face (the upper end face) of the piston 54. The pin 55 reciprocates in the valve hole 51b1 of the valve seat 51b, and a distal end makes contact with the ball valve 51a thus moving the ball 51a up and down. The piston 54 is configured to be pushed toward one end side (the upward direction) by the biasing force of the spring 56 arranged between the piston 54 and the closing member 53, and to make contact with the upper end face of the larger diameter hole 50a2. The biasing force of the spring 56 is greater than the biasing force of the spring 52. The pressure adjusting reservoir 34 is set so that the distal end of the pin 55 projects from the valve seat 51b by the predetermined distance S1 when the piston 54 is brought into contact with the upper end face of the larger diameter hole 50a. The ball valve 51a can be stroked by the predetermined distance S1 with respect to the valve seat 51b. Accompanying the movement of the piston 54, a reservoir chamber 50d for storing the brake fluid is formed between the pressure adjusting valve 51 and the piston 54 in the step hole 50a.

Accompanying the increase in inflow amount of the brake fluid to the reservoir hole 50b by the increase in stroke, the piston 54 is pushed down by the predetermined distance S1 against the biasing force of the spring 56. Thus, the pin 55 and the ball valve 51a are also moved, the ball valve 51a is brought into pressure-contact with the valve seat 51b, and the valve hole 51b1 is closed. Thus, the pressure adjusting valve 51 is in the valve closed state when the stroke reaches the predetermined amount. In this state, the master pressure is not applied to the intake port of the pump 37. Furthermore, in this state, the master pressure generated by the pressing of the brake pedal 21 is applied as it is to the wheel cylinders WC1 to WC4.

Even with such configurations, the brake fluid flows into the reservoir chamber 50d until the stroke reaches the predetermined amount, and thus the generation of the master pressure is suppressed. However, in the case of such configurations, a slight master pressure ($\neq 0$) is generated according to the increase in the stroke due to the pressure generated in the reservoir chamber 50d. Even with such configurations, effects similar to those of the embodiment described above are exhibited.

Figure 13:
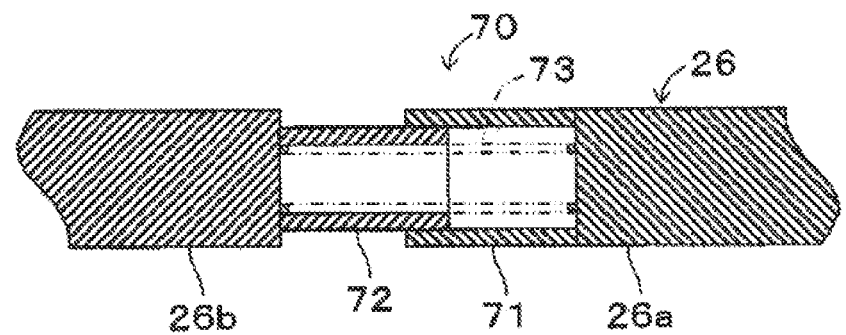
FIG. 13 is an explanatory view describing an operating rod of a modification of the present embodiment.

The configuration of generating the invalid stroke may be realized by the configuration of the operating rod 26, as shown in FIG. 13, for example, in place of the configuration of the embodiment described above (the configuration of suppressing by the master cylinder 23). In this case, the operating rod 26 is configured so that the operation force applied to the brake pedal 21 is not transmitted to the first piston 23b until the stroke reaches the predetermined amount from zero, and is configured so that the operation force applied to the brake pedal 21 is transmitted to the first piston 23b when the stroke is greater than or equal to the predetermined amount. The operating rod 26 includes an operation force transmitting mechanism 70 for realizing the functions described above. The operation force transmitting mechanism 70 is arranged at a joining portion of a first operating rod 26a and a second operating rod 26b configuring the operating rod 26. A tube portion 71 is formed at the other end of the first operating rod 26a having the brake pedal 21 attached to one end. A tubular engaging portion 72 accommodated in the tube portion 71 so as to slidably reciprocate is formed at one end of the second operating rod 26b. The tubular engaging portion 72 is configured so as not to fall out from the tube portion 71. Furthermore, a spring 73 for biasing both members in the reciprocating directions is accommodated between the tube portion 71 and the tubular engaging portion 72.

Even with such configurations, the first operating rod 26a relatively moves with respect to the second operating rod 26b, and the second operating rod 26b does not move forward, until the stroke reaches the predetermined amount from zero. When the stroke reaches the predetermined amount, the first operating rod 26a makes contact with the distal end of the tubular engaging portion 72, and the first operating rod 26a and the second operating rod 26b integrally move forward according to the increase in the stroke. Even with such configurations, effects similar to those of the embodiment described above are exhibited.

CONCLUSION

A braking device for a vehicle of the present embodiment includes: a storage unit 61 storing a first relationship f1 and a second relationship f2, the first relationship f1 being a relationship of a brake operation amount and a first differential pressure when the brake operation amount (stroke) is in a range smaller than a first brake operation amount (predetermined amount) and is increasing, and the second relationship f2 being a relationship of the brake operation amount and the first differential pressure when the brake operation amount is in a range smaller than the first brake operation amount and is reducing; and a control unit 62 that controls differential pressure valves 31, 41, based on the first relationship f1 and the second relationship f2 stored in the storage unit 61, wherein the first relationship f1 is a relationship in which the first differential pressure increases as the brake operation amount increases, the second relationship f2 is a relationship in which the first differential pressure reduces as the brake operation amount reduces, and a reduction width of the first differential pressure per unit reduction width of the brake operation amount in the second relationship f2 is set to be greater than an increase width of the first differential pressure per unit increase width of the brake operation amount in the first relationship f1.

Furthermore, when the brake operation amount is smaller than the first brake operation amount, and the brake operation amount changes from reduction to increase before the brake operation amount becomes zero, the control unit 62 increases the first differential pressure according to the increase in the brake operation amount so that a sum of the "hydraulic pressure braking force corresponding to the first differential pressure" and the "regenerative braking force" becomes a value corresponding to the maximum regenerative braking force at the time point when the brake operation amount reaches the first brake operation amount.

The invention claimed is:

1. A braking device for a vehicle comprising:
   a hydraulic pressure braking device that applies, to a wheel of the vehicle, a hydraulic pressure braking force corresponding to a hydraulic pressure in a wheel cylinder; and
   a regenerative braking device that applies, to the wheel, a regenerative braking force obtained by converting a kinetic energy of the wheel to an electrical energy,
   the hydraulic pressure braking device including:
   a differential pressure valve arranged on a hydraulic pressure path connecting a master chamber of a master cylinder and the wheel cylinder; and
   a pump that ejects brake fluid to a portion between the differential pressure valve and the wheel cylinder on the hydraulic pressure path; and
   the braking device for the vehicle being configured to adjust a differential pressure on a master chamber side and a wheel cylinder side of the differential pressure valve while activating the pump and suppress generation of a master pressure that is the hydraulic pressure in the master chamber until a brake operation amount reaches a first brake operation amount, the first brake operation amount being set based on a maximum regenerative braking force generable by the regenerative braking device;

wherein the braking device for the vehicle further includes:
   a storage unit storing a first relationship and a second relationship, the first relationship being a relationship of the brake operation amount and the differential pressure when the brake operation amount is in a range smaller than the first brake operation amount and is increasing, and the second relationship being a relationship of the brake operation amount and the differential pressure when the brake operation amount is in a range smaller than the first brake operation amount and is reducing; and
   a control unit that controls the differential pressure valve, based on the first relationship and the second relationship stored in the storage unit;
   the first relationship is a relationship in which the differential pressure increases as the brake operation amount increases;
   the second relationship is a relationship in which the differential pressure reduces as the brake operation amount reduces; and
   a reduction of the differential pressure following a specific change amount of the brake operation amount in the second relationship is set to be greater than an increase of the differential pressure following the specific change amount of the brake operation amount in the first relationship, wherein
   when the brake operation amount is smaller than the first brake operation amount, and the brake operation amount changes from reduction to increase before the brake operation amount becomes zero, the control unit increases the differential pressure according to the increase in the brake operation amount so that a sum of the hydraulic pressure braking force corresponding to the differential pressure and the regenerative braking force becomes a value corresponding to the maximum regenerative braking force at a time point when the brake operation amount reaches the first brake operation amount.

* * * * *